(12) United States Patent
Evatt et al.

(10) Patent No.: US 8,555,919 B2
(45) Date of Patent: Oct. 15, 2013

(54) BALL VALVE WITH INTEGRATED CAM OPERATED INTERNAL MICROSWITCH

(75) Inventors: S. Clay Evatt, Greenville, SC (US); Gregory Stephen Childers, Greer, SC (US)

(73) Assignee: Wabtec Holding Corp., Wilmerding, PA (US)

(*) Notice: Subject to any disclaimer, the term of this patent is extended or adjusted under 35 U.S.C. 154(b) by 108 days.

(21) Appl. No.: 13/032,935

(22) Filed: Feb. 23, 2011

(65) Prior Publication Data

US 2012/0211098 A1 Aug. 23, 2012

(51) Int. Cl.
*F17D 3/00* (2006.01)
(52) U.S. Cl.
USPC ............................................. 137/554; 200/573
(58) Field of Classification Search
USPC .................................. 137/554, 553; 200/573
See application file for complete search history.

(56) References Cited

U.S. PATENT DOCUMENTS

| | | | | |
|---|---|---|---|---|
| 2,989,988 A | * | 6/1961 | Rudelick | 137/624.19 |
| 4,194,528 A | | 3/1980 | Kepler | |
| 4,967,792 A | * | 11/1990 | Magee | 137/552 |
| 5,193,780 A | | 3/1993 | Franklin | |
| 5,263,682 A | * | 11/1993 | Covert et al. | 251/214 |
| 6,003,837 A | * | 12/1999 | Raymond et al. | 251/129.12 |
| 6,267,139 B1 | * | 7/2001 | Miklo et al. | 137/554 |
| 6,343,615 B1 | * | 2/2002 | Miller et al. | 137/202 |
| 6,899,128 B2 | | 5/2005 | Oh | |
| 2001/0035510 A1 | | 11/2001 | Oh | |
| 2003/0033867 A1 | | 2/2003 | Posey et al. | |
| 2007/0023721 A1 | * | 2/2007 | Lomicka et al. | 251/129.11 |

FOREIGN PATENT DOCUMENTS

| | | |
|---|---|---|
| CN | 201373133 Y | 12/2009 |
| CN | 201554894 U | 8/2010 |
| DE | 29910174 U1 | 10/1999 |
| JP | 2003194256 A | 7/2003 |
| KR | 200417400 Y1 | 5/2006 |

* cited by examiner

*Primary Examiner* — Craig Schneider
*Assistant Examiner* — Angelisa Hicks
(74) *Attorney, Agent, or Firm* — The Webb Law Firm

(57) ABSTRACT

A ball valve includes a valve housing that has a main passage defined therein and a valve assembly that includes a valve body, which is movable within the main passage between open and closed positions, and a valve stem that fixedly engages the valve body. A handle is disposed on the valve housing that is connected to the valve stem and is operable to rotate the valve body between the open and closed positions via the valve stem. A switch is disposed within the housing, which operatively engages the valve assembly and is configured to transmit a signal to an operator's station regarding the position of the valve body.

14 Claims, 4 Drawing Sheets

BALL VALVE WITH INTEGRATED CAM OPERATED INTERNAL MICROSWITCH

BACKGROUND OF THE INVENTION

1. Field of the Invention

The present invention relates to a ball valve that is operative as a cut out valve in a compressed air system of a train or locomotive. More particularly, the present invention relates to a ball valve that includes an internal microswitch that engages a valve stem of the ball valve and is actuated to transmit a signal to an operator's station of the train or locomotive indicating the open or closed condition of the ball valve.

2. Description of Related Art

Railway freight cars and locomotives typically include one or more cut out valves, which may be vented or non-vented valves, located in a compressed air system for distributing compressed air to leveling bolsters and disc brake units of the freight car or locomotive. The compressed air system may use one or more cut out valves to vent compressed air from the system before maintenance or removal of the equipment within the compressed air system. Many such valves have an external switch attached to them by a bracket that is activated through an interaction between a portion of the valve handle depressing a 'button' on the switch when the handle is actuated to open or close the valve. The switch will then relay the appropriate signal to cause a light or similar indicator to be activated inside an operator's station for the train or locomotive.

This configuration has certain drawbacks because it potentially creates a loading condition on the switch 'button' that is not desirable by allowing the handle to bottom the switch 'button' out in certain circumstances. Also, the switch is exposed to conditions under the freight or railway car that cause damage or premature failure of the switch.

SUMMARY OF THE INVENTION

Accordingly, there is a general need for a valve assembly useful as a cut out valve in a compressed air system that includes an integrated internal switch for transmitting a signal regarding the open or closed state of the valve to an operator's station or another location of the railway vehicle or locomotive.

According to one embodiment, the valve provides a cut out point for a compressed air system of a railway vehicle or locomotive that has the capability to alert a train operator or other personnel that a compressed air line is cut out by using an internal switch. Additionally, a switch may be enclosed inside a housing of the valve to protect the switch from the environment and reduce the overall footprint of, for example, a panel mounted or an in line ball valve. Further, the valve as described in detail herein reduces the risk of damage to the internal microswitch during valve operation by creating a cam profile on the valve stem to engage and actuate the microswitch.

In one embodiment, a ball valve (vented or non-vented) is provided which houses an internal microswitch that is actuated by an interaction between the switch lever and the cam profile machined in the ball valve stem. This assembly can be implemented on in line ball valves or panel mounted ball valves. The cam profile that is machined into the stem can be adjusted depending on the degree of desired rotation until actuation, clockwise or counterclockwise rotation, or any other scenario. Integrating the microswitch inside the valve body provides protection against the environment and reduces the risk of damage by loose objects present under a train in service. The switch is activated through the use of the cam profile machined on the valve stem, which allows for less stress to be placed on the switch. As the valve stem rotates about its center axis, the profile rides up the switch lever until the switch becomes activated. This process allows a rotation stop to be placed on the valve that is separate from the switch, creating a condition where no undesired loading is present on the switch.

According to one particular embodiment, a ball valve is provided that includes a valve housing having a main passage defined therein, and a valve assembly. The valve assembly includes a valve body at least partially disposed within the main passage of the housing. The valve body is rotatable within the housing between an open position allowing passage of fluid or gas through the main passage of the housing, and a closed position blocking passage of fluid through the main passage of the housing. A valve stem fixedly engages the valve body and is rotatably disposed within the housing. The ball valve also includes a handle disposed on the valve housing. The handle is connected to the valve stem and is operable to rotate the valve stem and the valve body to move the valve body between the open and closed positions. A switch is disposed within the housing. The switch operatively engages the valve assembly and is configured to transmit a signal to an operator's station or other location regarding the position of the valve body.

According to one embodiment, the switch is configured to transmit the signal when the valve body is in the open position. According to another embodiment, the switch is configured to transmit the signal when the valve body is in the closed position. According to yet another embodiment, the switch is configured to transmit the signal when the valve body is in a position between the open and closed positions. The switch may be a microswitch. The valve body is a desirably a ball having a bore extending therethrough.

The switch is disposed within the housing adjacent to the valve stem, and includes a lever arm that engages the valve stem. The lever arm is movable to actuate the switch to transmit the signal. The valve stem has an outer diameter and a recessed portion and the recessed portion and the outer diameter define a cam profile that engages the lever arm of the switch. The cam profile engages the lever arm of the switch such that the lever arm is in an extended position within the recessed portion of the valve stem when the valve body is in the open position, and the lever arm is in a depressed position when the valve body is not in the open position to actuate the switch to transmit the signal. Alternatively, the cam profile engages the lever arm of the switch such that the lever arm is in an extended position within the recessed portion of the valve stem when the valve body is in the closed position, and the lever arm is in a depressed position when the valve body is not in the closed position to actuate the switch to transmit the signal.

The ball valve may be an in line ball valve or a panel mounted ball valve.

The ball valve may also include sealing members disposed in the main passage of the housing. The sealing members are adapted to sealingly engage the valve body to prevent passage of fluid through the main passage around the valve body.

Further details and advantages of the various embodiments of the invention detailed herein will become clear upon reviewing the following detailed description of the preferred embodiments in conjunction with the accompanying drawing figures

DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
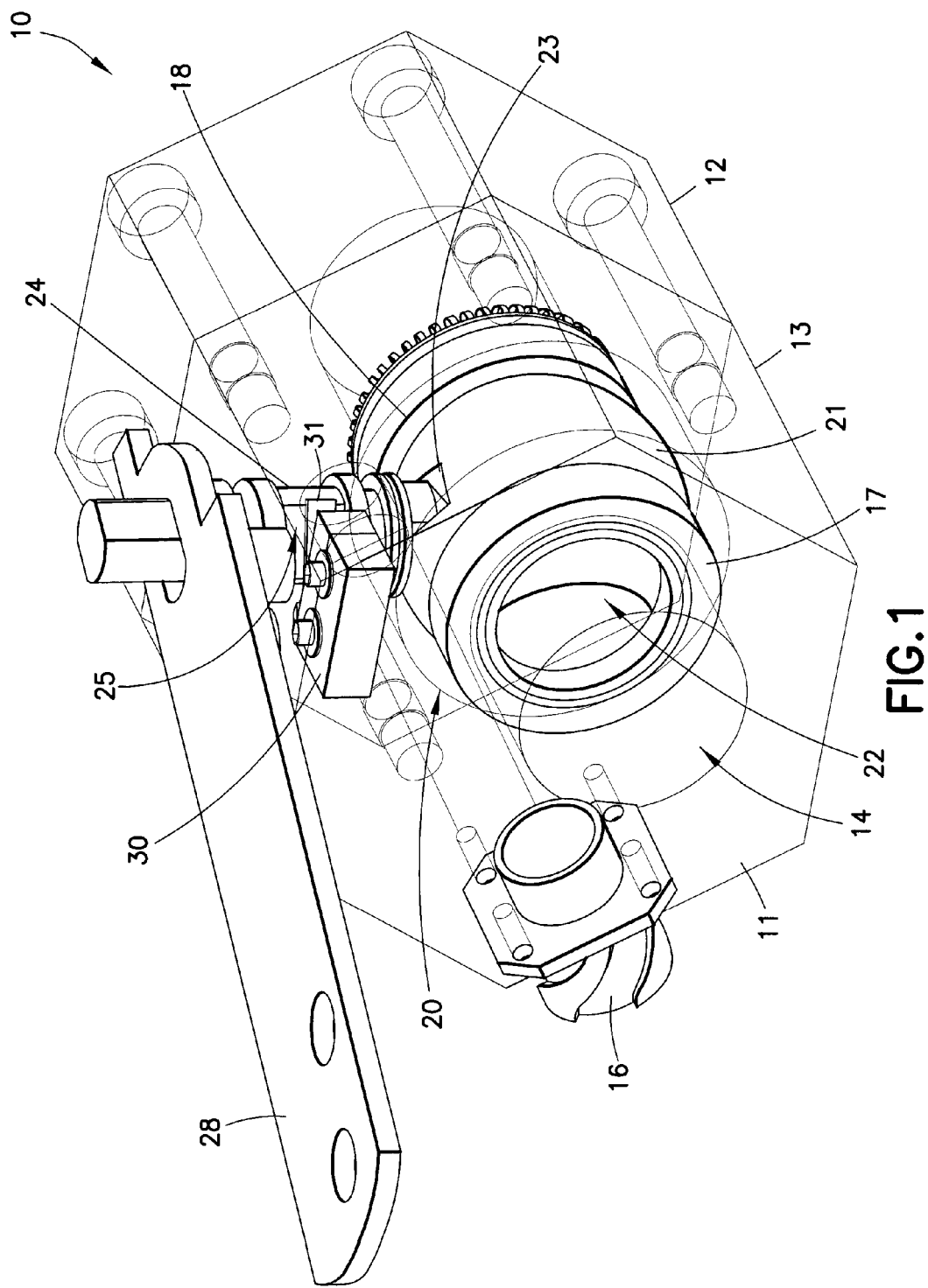
FIG. 1 is a perspective view of one embodiment of a ball valve.
Figure 2:
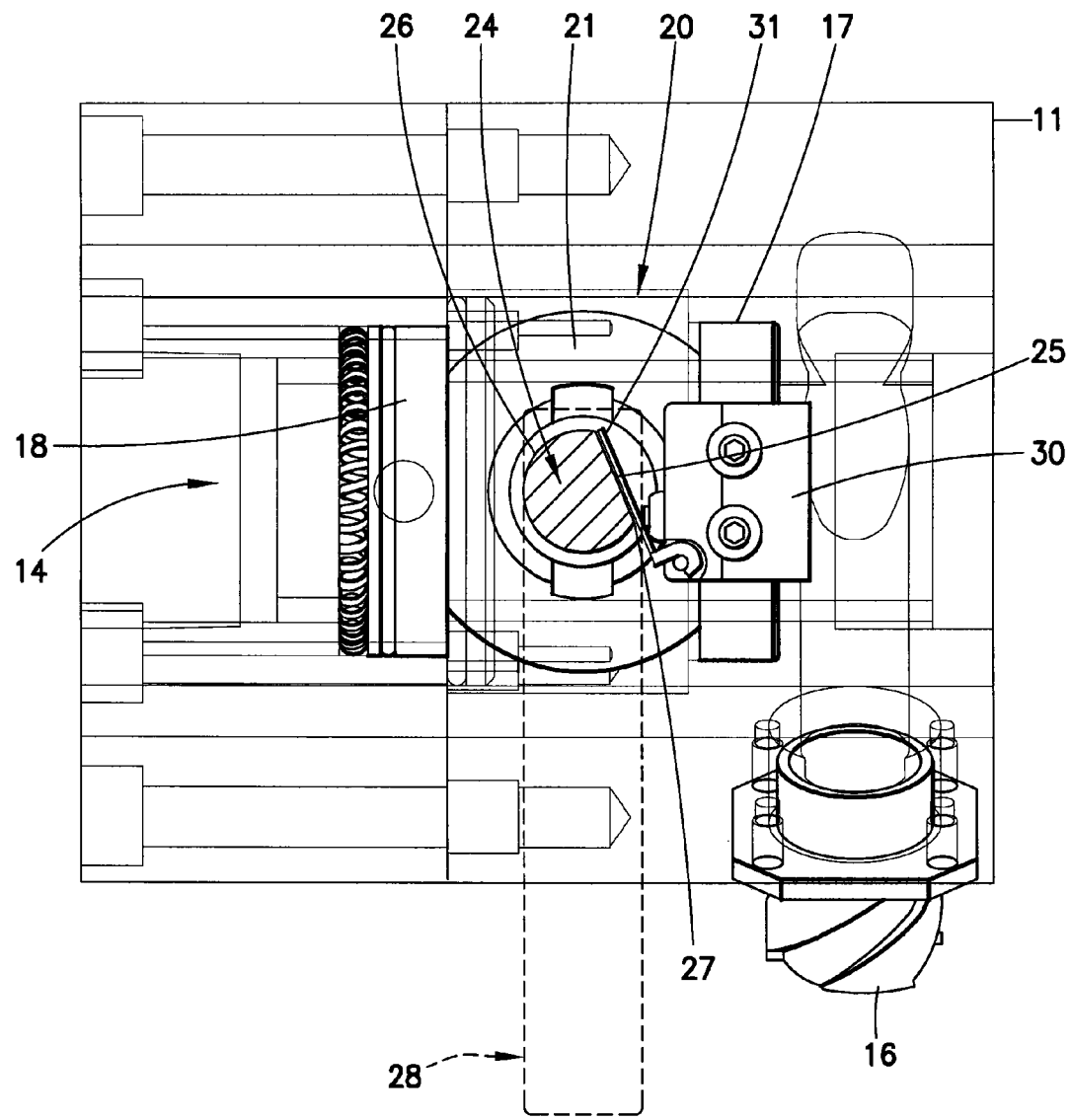
FIG. 2 is a top plan view of the ball valve of FIG. 1 with the ball valve in the closed position.
Figure 3:
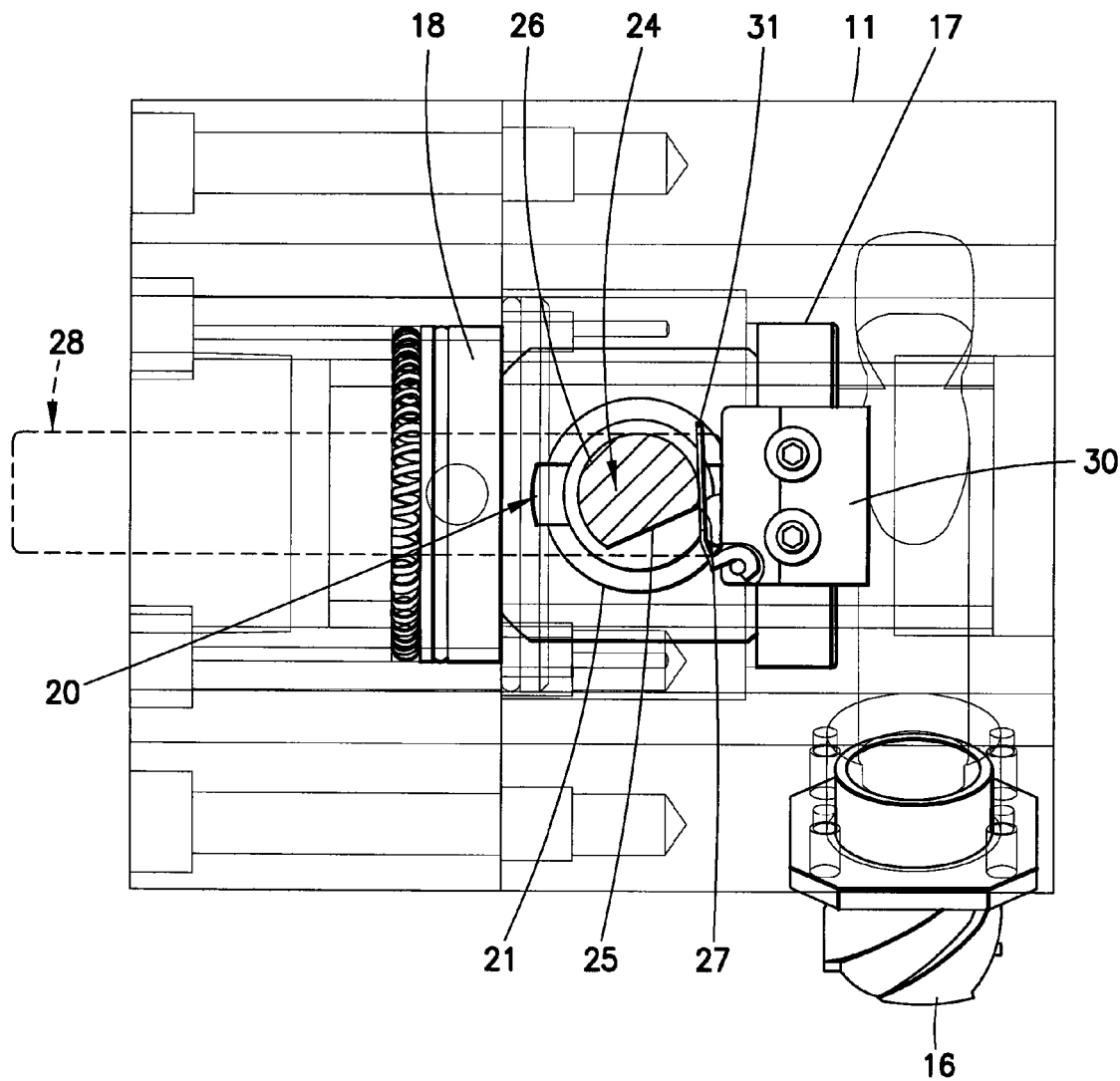
FIG. 3 is a top plan view of the ball valve of FIG. 1 with the ball valve in the open position.

Referring to FIGS. 1-3, an in line ball valve 10 according to one embodiment is depicted. As shown, the ball valve 10 includes a valve housing 11 composed of one or more housing portion 12, 13 that are connected together by fasteners (not shown). The valve housing 11 has a main passage 14 defined therein for allowing the passage of gas or liquid, particularly compressed air, through the ball valve 10. The valve housing 11 may also have a vent passage (not shown) defined therein to allow gas or liquid to pass from the main passage 14 to the outside of the ball valve 10 when the ball valve 10 is closed, thereby venting the compressed air conduit upstream of the valve 10. A connector 16 may be provided on the exterior of the housing 11 for connecting the valve 10 to an electrical relay or wiring conduit.

A valve assembly 20 is disposed within the housing 11 of the ball valve 10 for opening and closing the main passage 14. The valve assembly includes a valve body 21 that is at least partially disposed within the main passage 14 of the housing 11. The valve body 21 includes a bore 22 extending therethrough and is rotatable within the main passage 14 between an open position and a closed position. In the open position, the bore 22 of the valve body 21 is aligned with the main passage 14 to allow passage of gas or liquid through the main passage 14 of the housing 11. In the closed position, the bore 22 of the valve body 21 is not aligned with the main passage 14 to block the passage of gas or liquid through the main passage 14.

When the valve body 21 is in the closed position, the valve body 21 blocks passage of fluid through the main passage 14 and may additionally allow gas or liquid to pass from the main passage 14 to the vent passage (not shown) upstream of the valve body 21 so that the gas or liquid exits the housing 11. As shown, the valve body 21 is a ball, though it is to be appreciated that the valve body may have any shape known to be suitable to those having ordinary skill in the art. Sealing members 17, 18 are also positioned in the main passage 14. The sealing members are adapted to sealingly engage the valve body 21 within the main passage to prevent passage of gas or liquid through the main passage 14 around the exterior of the valve body 21.

The valve assembly 20 also includes a valve stem 24 that is rotatably disposed in the valve housing 11 and extends through the housing 11 from the main passage 14 to the exterior of the housing 11. The valve stem 24 fixedly engages a notch 23 formed in the valve body 21 so that the valve stem 24 is rotatably fixed with respect to the valve body 21 and is able to transmit torque to the valve body 21 to move the valve body 21 between the open and closed positions. The valve stein 24 has an outer diameter 26 and a recessed portion 25 formed in the outer diameter. As shown in FIGS. 2 and 3, the recessed portion 25 is a flat recess formed in the valve stein 24. Together, the recessed portion 25 and the outer diameter 26 define a cam profile 27.

A handle 28 is disposed on the valve housing 11. The handle 28 is connected to the valve stem 24 and is operable through manual or mechanical actuation to rotate the valve stem 24 and the valve body 21 to move the valve body 21 between the open and closed positions.

A switch 30 is also disposed within the housing 11 and operatively engages the valve assembly 20. The switch 30 is configured to transmit a signal to an operator's station located elsewhere on the locomotive or other railway vehicle regarding the position of the valve body 21 so as to alert the train operator or worker of the position of the ball valve 10. For instance, the switch 30 may be configured to transmit the signal when the valve 10 is open, as shown in FIG. 3, or to transmit the signal when the valve 10 is closed and the flow of compressed air through the valve 10 has been cut off. Additionally, the switch 30 may be configured to transmit the signal when the valve 10 is between the fully closed and fully open conditions and the flow of gas or liquid through the valve 10 is obstructed by the valve body 21 but not fully blocked. As shown, the switch 30 is a microswitch integrated into the housing 11 of the ball valve 10, though it is to be appreciated that the switch 30 may be of any type or configuration known to be suitable to those having ordinary skill in the art. Additionally, the switch 30 may be connected to the operator's station or other location through electrical or fiber optic or similar physical relays or via wireless transmissions.

As shown in FIGS. 1-3, the switch 30 is disposed within the housing 11 adjacent to the valve stem 24. The switch 30 includes a lever arm 31 that extends from the switch 30 and engages the cam profile 27 of the valve stem 24. The lever arm 31 is movable to actuate the switch 30 to transmit the signal. As shown in FIGS. 2 and 3, the cam profile 27 on the valve stem 24 engages the lever arm 31 of the switch 30 such that the lever arm 31 is in an extended position within the recessed portion 25 of the valve stem 24 when the valve body 21 is in the closed position, and the lever aim 31 is in a depressed position when the valve body 21 is in the open position to actuate the switch 30 to transmit the signal to the operator's station or other location.

With reference continued to FIGS. 1-3, operation of the ball valve 10 will now be described. As shown in FIG. 2, when the valve body 21 is in the closed position so that gas or liquid is not able to flow through the main passage 14 of the valve 10 and may instead be vented from the valve housing 11, the switch 30 is not actuated to send a signal to the operator's station and the switch arm 31 is in the extended position within the recessed portion 25 of the valve stem 24. When the handle 28 is rotated 90° in the clockwise direction, as shown in FIG. 3, the valve body 21 is in the open position and the gas or liquid is allowed to flow through the ball valve 10. The rotation of the handle 28 causes the cam profile 27 in the valve stem 24 to engage the lever arm 31 and move the lever arm 31 into the depressed position, thus actuating the switch 30 to send a signal to the operator's station indicating that the valve 10 is open and gas or liquid is able to flow through the system. The recessed portion 25 and the cam profile 27 are formed to allow for smooth depression of the lever arm 31.

It is to be appreciated that the recessed portion 25 and the cam profile 27 may be machined or otherwise formed in the valve stem 24 in any manner known to be suitable by those having ordinary skill in the art and according to the specific system that will incorporate one or more valves 10. For instance, the recessed portion 25 and the cam profile 27 may be formed to depress the lever arm 31 and actuate the switch 30 with a 10° handle rotation, to actuate the switch 30 when the valve body 21 is in the closed position, or to adjust the location and depth of the recessed portion 25.

According to one embodiment of the present invention, the cam profile 27 is formed such that the lever arm 31 is in an extended position within the recessed portion 25 of the valve stem 24 when the valve body 21 is in the closed position shown in FIG. 2 and the lever arm 31 is in a depressed position when the valve body 21 is not in the closed position to actuate the switch 30 to transmit the signal. Thus only partial rotational displacement of the valve body 21 from the closed position toward the open position shown in FIG. 3 is necessary to actuate the switch 30. According to another embodiment of the present invention, the cam profile 27 is formed such that the lever arm 31 is in an extended position within the recessed portion 25 of the valve stem 24 when the valve body 21 is in the open position and the lever arm 31 is in a depressed position when the valve body 21 is not in the open position to actuate the switch 30 to transmit the signal. Thus only partial rotational displacement of the valve body 21 from the open position toward the closed position is necessary to actuate the switch 30.

The housing 11 and/or valve stem 24 may also incorporate a rotation stop (not shown) that prevents rotation of the valve assembly 20 beyond what is necessary to move the valve body 21 between the open and closed positions to prevent undesired loading on the switch 30.

Figure 4:
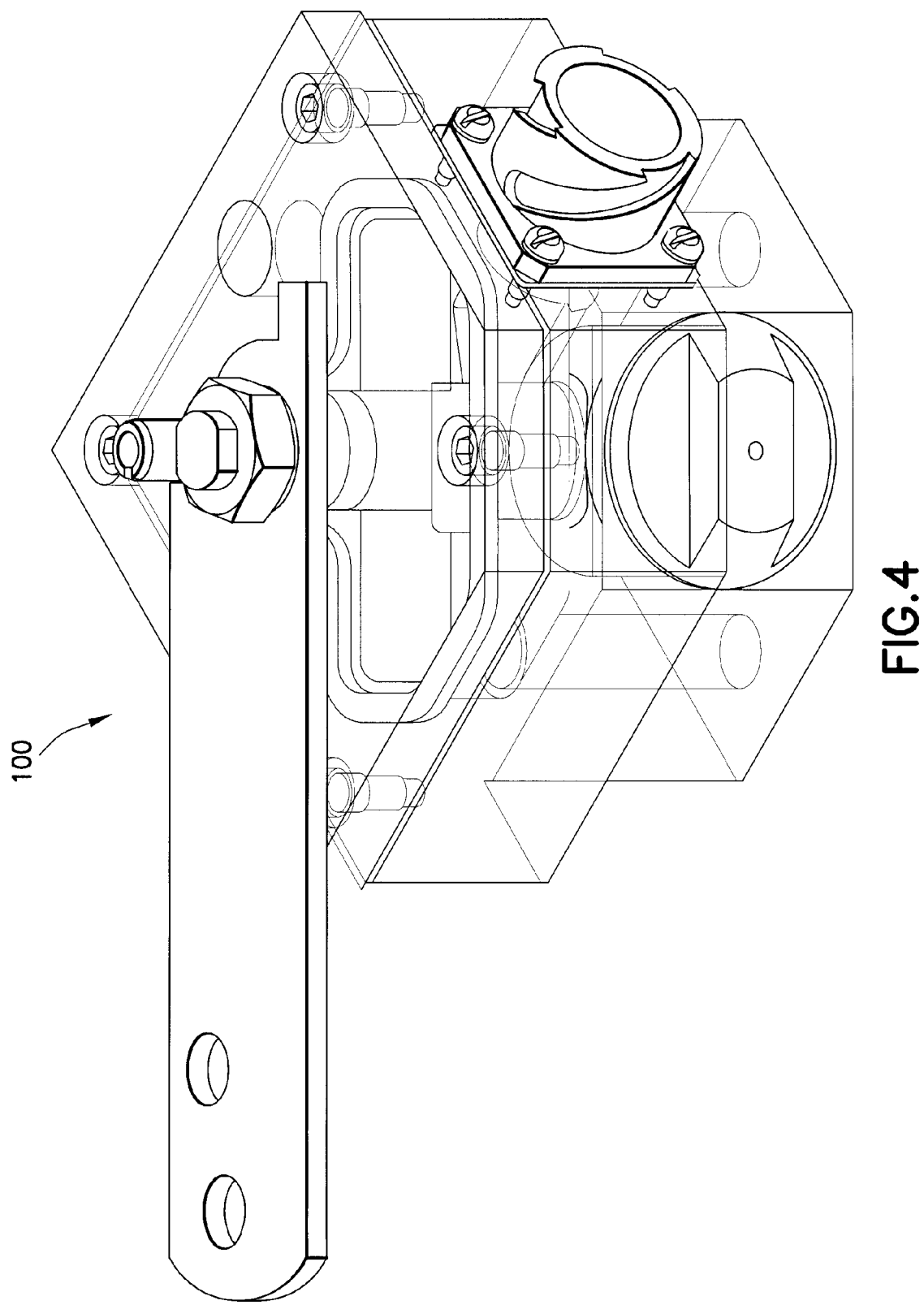
FIG. 4 is a perspective view of an embodiment of a panel mounted ball valve.

With reference to FIG. 4, a panel mounted ball valve 100 according to another embodiment is depicted. The valve assembly of the panel mounted ball valve 100 shown in FIG. 4 is the same as the in line valve 10 described above with reference to FIGS. 1-3 but the construction of the panel mounted ball valve 100 is such that the ball valve 100 is suitable to be attached to a flat surface of a wall of the train car or a piece of equipment. As shown in FIG. 4, the ball valve 100 may be vented in order to allow venting of compressed air at the point where the compressed air leaves or enters the wall or equipment.

The foregoing ball valves 10, 100 incorporate the concept of activating the switch 30 through the use of a profile machined on the valve stem 24 which will allow less stress to be placed on the switch 30. As the valve stem 24 rotates about its center axis, the profile will ride up the switch lever arm 31 until the switch 30 activates. This process allows a rotation stop to be placed on the ball valve 10, 100 that is separate from the switch 30, creating a condition where no undesired loading is present on the switch 30.

While embodiments of a ball valve for railway and like vehicles were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A ball valve, comprising:
   a valve housing, the valve housing having a main passage defined therein;
   a valve assembly, comprising:
     a valve body at least partially disposed within the main passage of the housing, the valve body being rotatable within the housing between an open position allowing passage of fluid through the main passage of the housing and a closed position blocking passage of fluid through the main passage of the housing; and
     a valve stem fixedly engaging the valve body and rotatably disposed within the housing;
   a handle disposed on the valve housing, the handle being connected to the valve stem and operable to rotate the valve stem and the valve body to move the valve body between the open and closed positions; and
   a switch disposed within the housing, the switch operatively engaging the valve assembly and being configured to transmit a signal to an operator's station regarding the position of the valve body,
   wherein the switch is disposed within the housing adjacent to the valve stem, the switch includes a lever arm that engages the valve stem, and the lever arm is movable to actuate the switch to transmit the signal,
   wherein the valve stem has an outer diameter and a recessed portion, and the recessed portion and the outer diameter define a cam profile that engages the lever aim of the switch,
   wherein the outer diameter of the valve stem is defined by an arcuate exterior surface of the valve stem, and
   wherein the recessed portion is defined in the outer diameter of the valve stem and comprises a recess formed in the valve stem, and the recess comprises at least one surface that intersects with the arcuate exterior surface.

2. The ball valve according to claim 1, wherein the switch is configured to transmit the signal when the valve body is in the open position.

3. The ball valve according to claim 1, wherein the switch is configured to transmit the signal when the valve body is in the closed position.

4. The ball valve according to claim 1, wherein the switch is configured to transmit the signal when the valve body is in a position between the open and closed positions.

5. The ball valve according to claim 1, wherein the switch is a microswitch.

6. The ball valve according to claim 1, wherein the valve body is a ball having a bore extending therethrough.

7. The ball valve according to claim 1, wherein the cam profile engages the lever arm of the switch such that the lever arm is in an extended position within the recessed portion of the valve stem when the valve body is in the open position and the lever arm is in a depressed position when the valve body is not in the open position to actuate the switch to transmit the signal.

8. The ball valve according to claim 1, wherein the cam profile engages the lever arm of the switch such that the lever arm is in an extended position within the recessed portion of the valve stem when the valve body is in the closed position and the lever arm is in a depressed position when the valve body is not in the closed position to actuate the switch to transmit the signal.

9. The ball valve according to claim 1, wherein the ball valve is an in line ball valve.

10. The ball valve according to claim 1, wherein the ball valve is a panel mounted ball valve.

11. The ball valve according to claim 1, further comprising sealing members disposed in the main passage of the housing, the sealing members being adapted to sealingly engage the valve body to prevent passage of gas or liquid through the main passage around the valve body.

12. The ball valve according to claim 1, wherein the at least one surface of the recess comprises at least one flat surface.

13. The ball valve according to claim 12, wherein the at least one flat surface of the recess comprises a single flat surface that intersects with the arcuate exterior surface at two different points of the outer diameter of the valve stem.

14. The ball valve according to claim 12, wherein the recess intersects with the arcuate exterior surface at two different points of the outer diameter of the valve stem and the arcuate exterior surface extends continuously about a circumference of the outer diameter of the valve stem between the two different points.

* * * * *

UNITED STATES PATENT AND TRADEMARK OFFICE
CERTIFICATE OF CORRECTION

PATENT NO.        : 8,555,919 B2                                              Page 1 of 1
APPLICATION NO.   : 13/032935
DATED             : October 15, 2013
INVENTOR(S)       : S. Clay Evatt et al.

It is certified that error appears in the above-identified patent and that said Letters Patent is hereby corrected as shown below:

In the claims

Column 6, Line 22, Claim 1, delete "aim" and insert -- arm --

Signed and Sealed this
Eighteenth Day of February, 2014

Michelle K. Lee
*Deputy Director of the United States Patent and Trademark Office*